Sept. 6, 1966    J. D. SWARTZBAUGH ETAL    3,270,909
SECTIONAL FOOD TRAY

Filed Sept. 6, 1963    2 Sheets-Sheet 1

INVENTORS
JOHN D. SWARTZBAUGH
BLAIR E. STENTZ
BY
Owen + Owen
ATTORNEYS

Sept. 6, 1966    J. D. SWARTZBAUGH ETAL    3,270,909
SECTIONAL FOOD TRAY
Filed Sept. 6, 1963    2 Sheets-Sheet 2
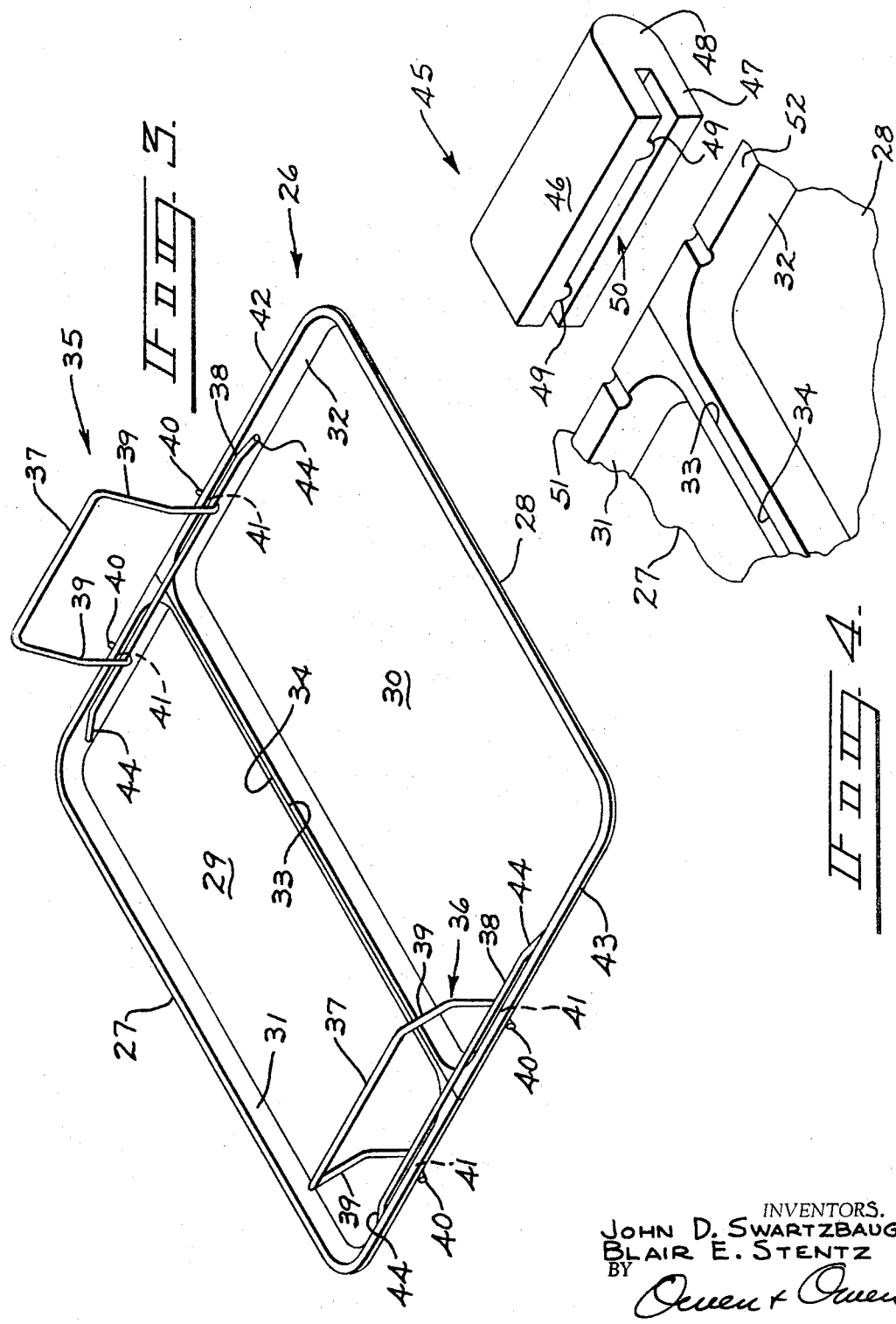
INVENTORS.
JOHN D. SWARTZBAUGH
BLAIR E. STENTZ
BY
Owen & Owen
ATTORNEYS

United States Patent Office 3,270,909
Patented Sept. 6, 1966

3,270,909
SECTIONAL FOOD TRAY
John D. Swartzbaugh and Blair E. Stentz, Murfreesboro, Tenn., assignors to United Service Equipment Co., Inc., Palmer, Mass., a corporation of Delaware
Filed Sept. 6, 1963, Ser. No. 307,099
6 Claims. (Cl. 220—23.4)

This invention relates to a food tray of the type used by hospitals or similar institutions where meals are served at locations remote from central cooking facilities.

More particularly, the invention relates to a sectional food tray whereby hot foods can be placed on one section of the tray and cold foods on another section, and then each section placed in a compartment of a food service cart having the proper temperature for transportation to the serving area. At the serving area, the separate sections are removed from their respective hot and cold compartments and assembled together and the food tray containing both hot and cold food dishes and beverages is delivered to the designated recipient.

In the past, food service carts were often divided into hot and cold compartments. One or more of the compartments, for example, the cold compartment was filled with trays upon which the food preparation personnel placed the cold items of the meal, such as salads and desserts. The hot items such as the meat and vegetable dishes were placed on or in individual plates or containers and then the plates were placed in a separate heated compartment of the food service cart. After the food cart was moved to the serving area, the server removed a tray containing the cold food from the cold compartment of the food cart. Next the server removed the plate containing the hot food from the separate heated compartment and placed the individual hot items upon the tray containing the cold items.

Because meals often are prepared by a dietician in the kitchen and often must be altered for the needs of the individual patient, the assembly of the correct meal for the correct patient by the server at the serving area was both time consuming and subject to human error.

The instant invention reduces the tray assembly time in the serving area. After the food is prepared in the kitchen, the hot food is placed upon one section of a food tray, which is the subject of the instant invention, and the cold food is placed upon the other section. The two sections are normally not the same size. The section with the greatest surface area is used for the hot foods in the winter, for example, and for the cold foods in the summer season.

Another advantage of a tray, constructed according to the instant invention, is that it is separable into two sections. The cold section can be "loaded" in the refrigeration portion of the food preparation area, while the hot section can be "loaded" in the portion of the food preparation area where the hot foods, ovens, etc. are located.

After the individual hot and cold sections are loaded with the pre-selected food, the tray sections, according to the instant invention, are placed within a food service cart. The dietician places the individual sections in a preselected position and the server merely removes the adjacent hot and cold sections, assembles the tray, and delivers the tray to the designated patient without having to select plates from another compartment of the food service cart to assemble the complete tray. This reduces the possibility of human error to a considerable extent.

Since all the food is on the tray sections when they are placed within the food service cart, the food cart can be considerably smaller than a conventional food cart which requires fully tray size compartments for the trays and cold food and separate compartments to hold the hot food dishes.

It is the object of the present invention to provide a food tray having hot and cold sections so designed that the sections can be loaded with hot and cold food plates and placed in hot and cold compartments, respectively, of a food service cart for delivery to a serving area. At the serving area, the sections of the food tray can be quickly assembled for delivery to the designated recipient.

It is another object of the instant invention to provide a food tray which will enable a dietician to load the tray with both hot and cold foods in the food preparation area and to place the associated tray sections in a food service cart whereby the server does not have to handle the individual plates of food at the serving area.

Still another object of the invention is to provide a food tray which eliminates the necessity of having an auxiliary compartment within a food service cart for the storage of hot food during transportation to the food serving area.

Other and more specific objects and advantages of a sectional food tray embodying the instant invention will be better understood from the following specification and drawings, in which:

FIG. 3 is a view in perspective showing a food tray embodying the instant invention; and FIG. 4 is a fragmentary view in perspective showing another embodiment of the instant invention with the handle separated from the tray sections.

Briefly, the present invention is a food tray comprising two rectangular sections. Each of the sections has a flat bottom and a raised lip extending around its periphery. At least one side of each of the food tray sections has an exterior surface on the lip which is complementary with a similar exterior surface on the lip of the other section. The two food tray sections are removably secured to each other in a side-by-side relationship by handle means.

Figure 1:
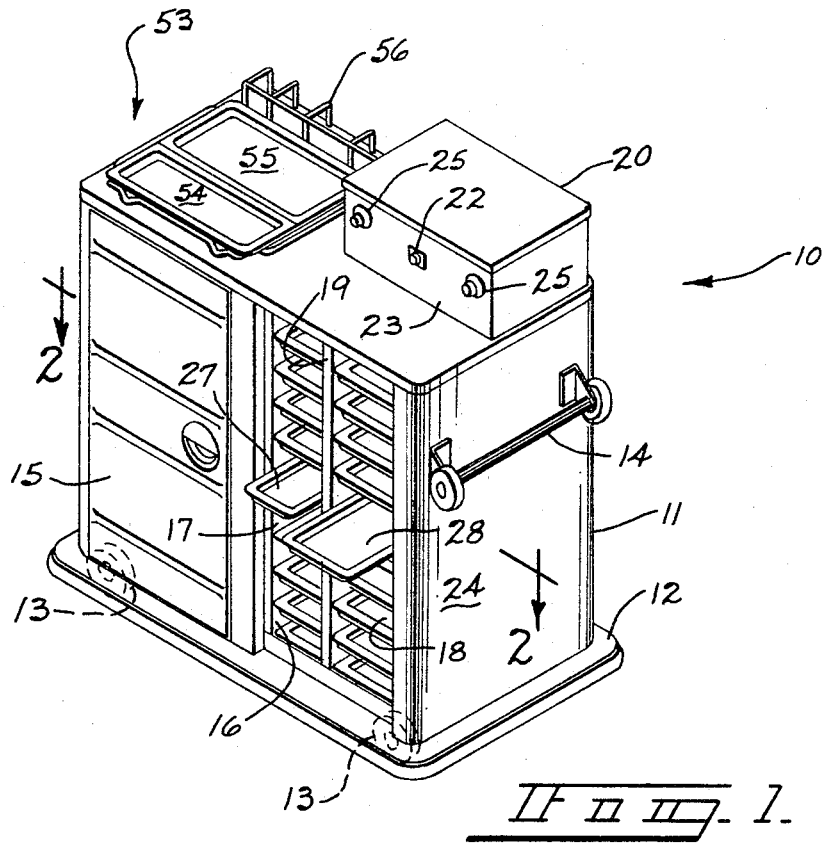
FIG. 1 is a view in perspective of a food service cart, with the door of the right-hand storage compartment removed showing a vertical array of food trays embodying the instant invention.

Referring to FIG. 1, a hot and cold food service cart, generally indicated at 10, has a rectangular cabinet 11, a base frame 12 which is mounted on a plurality of casters 13, and a handle 14.

Figure 2:
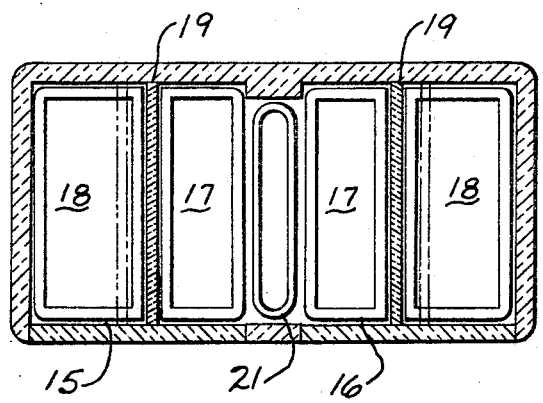
FIG. 2 is a horizontal sectional view taken along the line 2—2 of FIG. 1.

The cart 10 has two main compartments 15 and 16, each of which is divided into separate thermal sections, namely, a cold section 17 and a hot section 18. The thermal sections 17 and 18 are insulated from each other by a thermal barrier wall 19 as shown in FIG. 2. Since the thermal barrier wall 19 is a continuous insulated wall, there is very little chance of thermal currents of one compartment invading another compartment which is maintained at a different temperature.

As depicted in FIG. 2, the hot section 18 is larger than the cold section 17. However, the dash lines indicate an alternate position for the thermal barrier wall 19. The alternate position is used, for example, in the summer months when a larger cold section is desired within the food service cart 10.

A refrigeration compressor housing 20 is mounted on the upper surface of a cabinet 11. Preferably, there is no partition between the compartments 15 and 16 so that the two cold sections 17 form a single enclosure. A refrigeration coil 21 (FIG. 2) is located between the two cold sections 17 of the compartments 15 and 16 for chilling the enclosure between the thermal barrier walls 19 and cooling is regulated by a cold control dial 22 mounted on a front surface 23 of the housing 20.

Heating coils (not shown) are mounted on the interior surfaces of end walls 24 of the cabinet 11 and heating is regulated by heat control dials 25 also mounted on the front surface 23 of the housing 20.

Referring to FIG. 3, a tray embodying the instant invention is generally indicated at 26 and comprises two substantially rectangular sections 27 and 28. The sections 27 and 28 have flat bottoms 29 and 30. Both of the bottoms 29 and 30 lie in the same horizontal plane when the tray 26 is resting upon a horizontal surface.

A raised lip 31 extends around the periphery of the section 27 and a raised lip 32 similarly extends around the periphery of the section 28.

A side 33 of the section 27 has an exterior surface which is complementary to an exterior surface of a side 34 of the section 28. The two sections 27 and 28 are held in side-by-side relationship by handles 35 and 36. Each of the handles 35 and 36 comprises an inverted U-shaped member 37 and a rod 38 fastened perpendicularly to legs 39 of the U-shaped member 37, by welding or otherwise, at a point which is spaced inwardly from ends 40 of the U-shaped member 37. The lower portions of the legs 39 are bent outwardly forming approximately right angles with the remainder of the legs 39. The ends 40 of the legs 39 extend through apertures 41 formed in transverse sides 42 and 43 of the tray 26.

As shown in FIG. 3, the main portion of the rod 38 is parallel to the transverse side 42 or 43 and is located above the horizontal plane defined by the top surface of the lips 31 or 32. Lower portions 44 of the rod 38 are bent downwardly so that the ends of the lower portions 44 lie beneath the aforementioned horizontal plane and engage the interior surfaces of the transverse sides 42 and 43.

FIG. 4 shows a modification of the invention comprising another type of handle 45 which can be used on a tray constructed according to the instant invention. The handle 45 comprises an upper member 46, a lower member 47, spaced from and parallel to the upper member 46, and a body portion 48 joining the lower member 47 and the upper member 46 at one end.

The upper member 46 has two semi-cylindrical ribs 49 formed on its lower surface. The ribs 49 are perpendicular to a front surface 50 of the handle 45. When it is desired to fasten the sections 27 and 28 together, horizontal portions 51 and 52 of the lips 31 and 32 are "sandwiched" between the upper member 46 and the lower member 47 of the handle 45 with the ribs 50 engaging semi-circular recesses 53 formed in the horizontal portions 51 and 52 of the lips 31 and 32. A pair of handles 45, one at each end, hold the sections 27 and 28 in a snug side-by-side relationship.

In a typical operation, a dietician in a food preparation area places the correct food for a designated patient upon a food tray 26. The cold food is placed upon cold section 27 and inserted in the cold section 17 of the food service cart 10 and the hot food is placed upon section 28 and inserted into hot section 18, preferably on adjacent shelves or tray guides. The food service cart 10 is then transported to the food serving area. At this point, a food server removes the sections 27 and 28 and places them in a tray assembly rack 53 located on the top surface of the cabinet 11. The rack 53 has a recessed well 54 which receives the tray section 27 and a similar recessed well 55 which receives the tray section 28.

The server then removes a pair of handles 37 or 46 from a handle holding compartment 56 and attaches them to the food service tray sections 27 and 28. The food tray 26 can then be removed as a unit from the rack 53 and transported to the patient designated.

While the present invention has been disclosed in connection with a specific arrangement and disposition of the parts, it should be expressly understood that numerous modifications and changes may be made without departing from the scope of the appended claims.

What we claim is:

1. A food tray comprising, in combination, first and second rectangular tray sections, said first and second tray sections being movable between a separated position, and a connected position whereby said first and second tray sections are joined together along a parting line, each of said first and second sections having a flat bottom and a raised lip extending around the periphery of said bottom forming sides and ends thereon, an exterior surface on one side of first section which is complementary with a similar exterior surface on one side of said second tray section and a connecting means for securing said first and second tray sections in side-by-side relationship with said complementary exterior surfaces in abutment along said parting line, said connecting means consisting of a pair of handles, each of said handles including spaced apart, slideable attachment members, and guide means in each of said tray sections for receiving said attachment members on each side of said parting line, said guide means extending normal to said ends of said tray sections whereby, when said tray sections are joined along said parting line, said attachment members may be slideably received by or removed from said guide means by movement normal to said ends of said tray portions.

2. A food tray for use in a hot and cold food service cart having at least two thermal compartments comprising, in combination, first and second tray sections, said first and second tray sections being movable between a separated position whereby and said first tray section can be placed in one of such thermal compartments and said second tray section can be placed in another of such thermal compartments, and a connected position whereby said first and second tray sections are joined together along a parting line, each of said first and second tray sections having a flat bottom, a raised lip extending around the periphery of said bottom forming sides and ends thereon, said lip having a height less than the width of said bottom, at least one side of said first tray section having an exterior lip surface which is complementary with an exterior lip surface on one side of said second tray section, and removable connecting means for securing said first and second tray sections in side-by-side relationship when such tray is in such connected position, said connecting means consisting of handle means including spaced apart, slideable attachment members, and complementary shaped guide means on said lips on said ends of each of said tray sections for slideably receiving said handle attachment members on each side of said parting line, said guide means extending normal to said ends of said tray sections whereby, when said exterior lip surfaces are placed in abutment, said handle means may be slideably secured to said tray sections by movement normal to said ends of said tray sections.

3. The food tray of claim 2 wherein said handle means comprises an upper member, a lower member and a body portion connecting said upper and lower members, said upper and lower members spaced apart a distance sufficient to receive said guide means on said lips in said ends therebetween.

4. The food tray of claim 2 wherein said guide means comprises a rib on said lip in said end of each of said tray section and said attachment members of said handle means comprises a complimentarily shaped recess adapted to slideably receive said guide means.

5. A food tray for use in a hot and cold food service cart comprising, in combination two rectangular sections each having a flat bottom and a raised lip extending around at least three sides of the periphery of said bottom, a first one of the sides of each of said sections having an exterior surface which is complementary to a similar exterior surface on a first one of the sides of the other of said sections, the sides of each of said sections perpendicular to such first sides having apertures therein, and a pair of removable handles to secure said sections in a side-by-side relationship, each of said handles comprising a U-shaped member, a rod fastened perpendicularly to the legs of said U-shaped member and spaced inwardly from the ends of said U-shaped member, the lower portion of said legs being substantially perpendicular to the main portion of said U-shaped member and said ends of said U-shaped member being removably engaged with said apertures in said sides.

6. A food tray for use in a hot and cold food service cart having at least two thermal compartments comprising, in combination, first and second tray sections, said first and second tray sections being movable between a separated position whereby said first tray section can be placed in one of such thermal compartments and said second tray section can be placed in another of such thermal compartments, and a connected position whereby said first and second tray sections are joined together, each of said first and second tray sections having a flat bottom, a raised lip extending around the periphery of said bottom, said lip having a height less than the width of said bottom, at least one side of said first tray section having an exterior lip surface which is complementary with an exterior lip surface on one side of said second tray section, and connecting means for securing said first and second tray sections in side-by-side relationship when such tray is in such connected position, said connecting means comprising a pair of handles removably connected to opposed ends of said tray, each of said handles engaging adjacent lip portions of each of said first and second tray sections, and cooperating means on said lip portions for receiving said handles, wherein said cooperating means comprise an aperture defined by each of said adjacent lip portions of said first and second tray sections and wherein each of said handles comprises a U-shaped member having downwardly depending legs, said legs having outwardly extending portions at their lower ends engageable with such apertures and a rod perpendicularly mounted between said legs, the ends of said rod extending outwardly with respect to said legs and having downwardly directed portions adapted to engage the interior surfaces of said adjacent lip portions.

References Cited by the Examiner

UNITED STATES PATENTS

| 1,734,352 | 11/1929 | Smith. | |
| 1,866,074 | 5/1932 | Anglebeck. | |
| 2,101,492 | 12/1937 | Cogswell | 220—102 |
| 2,470,432 | 5/1949 | Cusick | 220—23.4 |

FOREIGN PATENTS

| 1,205,953 | 2/1960 | France. |
| 602,433 | 5/1948 | Great Britain. |

LOUIS G. MANCENE, *Primary Examiner.*

GEORGE E. LOWRANCE, *Examiner.*